United States Patent
Khunger et al.

(10) Patent No.: US 8,688,532 B2
(45) Date of Patent: Apr. 1, 2014

(54) REAL-TIME RIDE SHARE SYSTEM

(75) Inventors: Sanjay Khunger, Brighton, MI (US); Daryl L. Carr, Canton, MI (US)

(73) Assignee: General Motors LLC, Detroit, MI (US)

( * ) Notice: Subject to any disclaimer, the term of this patent is extended or adjusted under 35 U.S.C. 154(b) by 705 days.

(21) Appl. No.: 12/636,122

(22) Filed: Dec. 11, 2009

(65) Prior Publication Data

US 2011/0145089 A1   Jun. 16, 2011

(51) Int. Cl.
*G06Q 30/00*   (2012.01)

(52) U.S. Cl.
USPC .......................................... 705/26.1

(58) Field of Classification Search
USPC .......................................... 705/26, 27, 26.1
See application file for complete search history.

(56) References Cited

U.S. PATENT DOCUMENTS

| | | | |
|---|---|---|---|
| 2004/0088392 A1* | 5/2004 | Barrett et al. | 709/223 |
| 2008/0270019 A1* | 10/2008 | Anderson et al. | 701/201 |
| 2010/0153279 A1* | 6/2010 | Zahn | 705/80 |

* cited by examiner

*Primary Examiner* — Mila Airapetian
(74) *Attorney, Agent, or Firm* — Anthony Luke Simon; Reising Ethington P.C.

(57) ABSTRACT

A method of organizing the sharing of vehicle trips includes receiving a ride request from one or more riders, wherein the ride request includes a rider location and a rider destination, identifying a beginning waypoint and an ending waypoint for vehicle travel, determining a vehicle route based on the beginning and ending waypoints, choosing a rider whose rider location or rider destination is geographically closest to the determined vehicle route, presenting the rider location and rider destination of the chosen rider to the driver, and if the driver accepts, sending a notification to the chosen rider alerting the chosen rider of the acceptance.

18 Claims, 4 Drawing Sheets

REAL-TIME RIDE SHARE SYSTEM

TECHNICAL FIELD

The present invention relates generally to the sharing of vehicle trips or rides and more particularly to the use of wireless communications to coordinate the sharing.

BACKGROUND OF THE INVENTION

There exists a practice in which motorists who possess a vehicle offer vehicle rides to those who do not. This practice is variously labeled; such labels include ridesharing or carpooling. The reasons for taking part in this practice vary. It may be in an effort to conserve resources, obtain companionship for a particular drive, or help an environmental cause. Regardless, several inherent obstacles prevent more motorists from taking part in ridesharing, even if they would be open to doing so. For instance, organizing rides between a driver and a rider usually involves a certain amount of advanced planning. Often, telephone calls or emails are exchanged between the driver and the rider that negotiate the meeting place and time at which the two will meet. The planning of these communications can discourage potential drivers and riders from organizing vehicle trips. Additionally, safety concerns deter drivers and riders from seeking or giving rides. Frequently, riders and drivers know little about each other, which can create feelings of unease with respect to sharing a vehicle ride.

Increasingly, vehicle manufacturers outfit their vehicles with a wide array of wireless communications capabilities. Vehicle telematics devices installed in modern vehicles can wirelessly send both voice and data communications to a variety of recipients. Recipients can be central facilities that include servers and/or live advisors capable of responding to a telematics unit. Vehicles equipped with telematics units have the ability to gather a diverse array of data about vehicles and send it via the telematics unit.

SUMMARY OF THE INVENTION

According to an aspect of the invention, there is provided a method of organizing the sharing of vehicle trips. The method includes receiving a ride request from one or more riders, wherein the ride request includes a rider location and a rider destination, identifying a beginning waypoint and an ending waypoint for vehicle travel, determining a vehicle route based on the beginning and ending waypoints, choosing a rider whose rider location or rider destination is geographically closest to the determined vehicle route, presenting the rider location and rider destination of the chosen rider to the driver, and if the driver accepts, sending a notification to the chosen rider alerting the chosen rider of the acceptance.

According to another aspect of the invention, there is provided a method of organizing the sharing of vehicle trips. The method includes obtaining a set of driver trip preferences at a central facility, accepting a set of trip preferences from one or more riders, wherein the preferences include a rider location, receiving a message from the driver sent from a vehicle indicating that a rider is invited, accessing the trip preferences of the driver, comparing the trip preferences of the driver with the trip preferences of the one or more riders, identifying the rider whose set of trip preferences most closely match those of the driver, and communicating the location of the identified rider to the driver.

According to yet another aspect of the invention, there is provided a method of organizing the sharing of vehicle trips. The method includes obtaining a set of driver trip preferences at a central facility, uploading the driver trip preferences to a computer-based auction web portal, offering a trip to riders using the auction web portal based on the driver preferences, receiving a monetary offer or a location from one or more riders through the auction web portal, selecting a rider offering the highest monetary offer or the location nearest the driver, presenting the selected rider to the driver, if the driver accepts the selected rider, transmitting the location of the selected rider to the driver, and paying the driver the monetary offer received from the selected rider.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT

The method described below involves a method of ridesharing that links vehicle riders with vehicle drivers willing to give them a ride. The linking of riders and drivers can occur in real time with little advance planning or commitment. Drivers and riders within an acceptable distance of each other travelling to nearby destinations can, at any time of day, signal each other that an arrangement to travel together can be made. Drivers and riders can enter their preferences into a clearinghouse or computer-based web portal, such as a website, that posts them. The clearinghouse can include monetary offers on behalf of riders enticing potential drivers to select them. Additionally, the method can also help ensure a safe transaction between the driver and rider by obtaining identity and/or financial information from one or both. This can encourage riders/drivers who are uneasy about riding/driving with strangers to use the ridesharing service. Financial information can be used to facilitate payment from the rider to the driver automatically without passing any paper currency between the participants during the ride. If a driver decides that he would like to determine if a potential rider would be acceptable, he could activate a signal that causes the transmission of a plurality of possible rider identities/locations to the driver, in the vehicle or elsewhere. The driver can choose an acceptable rider from these identities. Or the driver can receive an automatically-selected rider based on predetermined preferences. The driver may then receive turn-by-turn directions to the rider's location.

Figure 1:
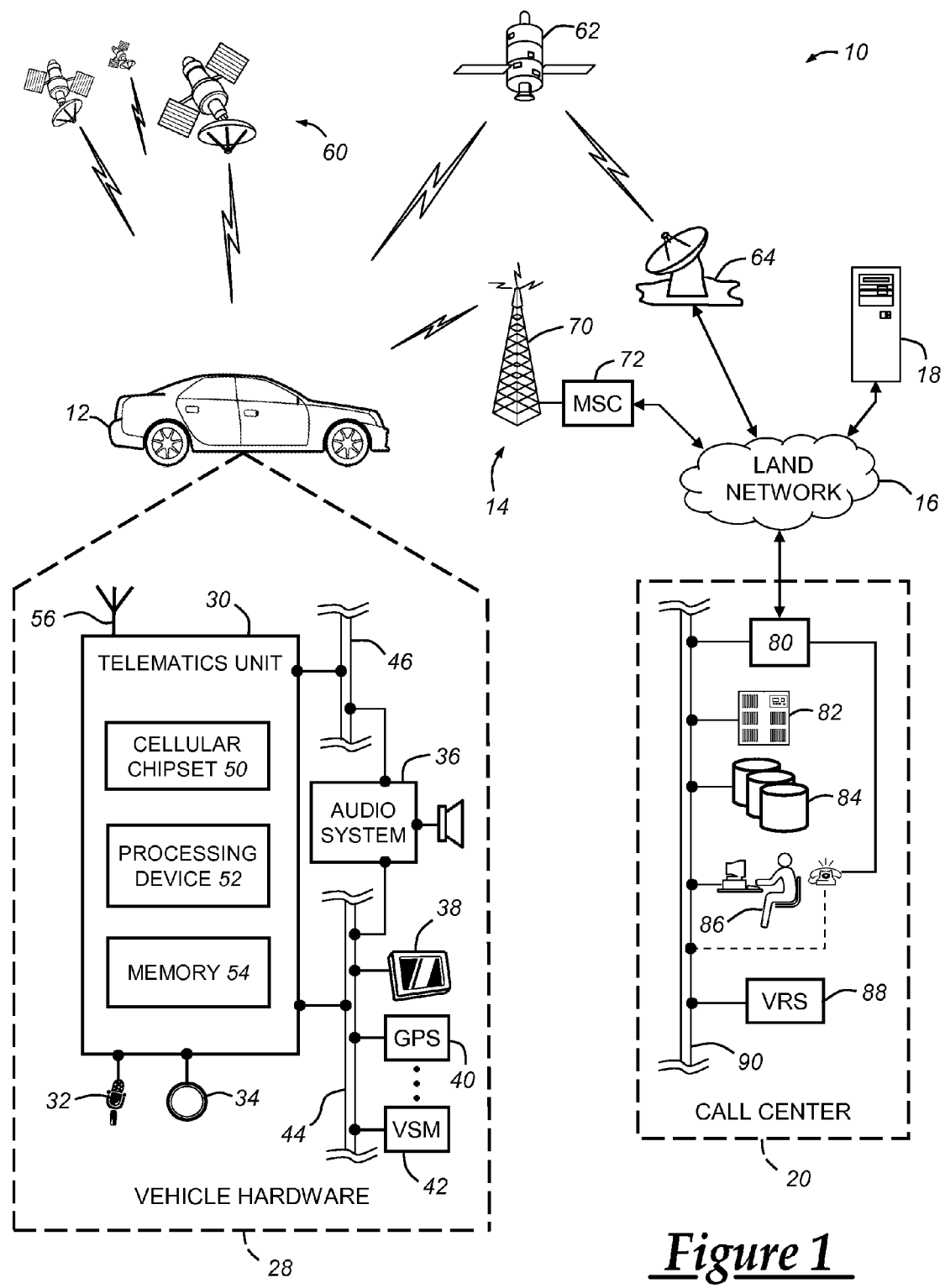
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the methods disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle telematics unit (VTU) 30 is an OEM-installed or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via short message service (SMS) or packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to GSM, W-CDMA, or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols used in the wireless industry such as 3 gpp or 3 gpp2. Wireless networking between the vehicle and other networked devices can also be carried out using telematics unit 30. For this purpose, telematics unit 30 can be configured to communicate wirelessly according to one or more protocols implemented per 3 gpp or 3 gpp2 standards and also other wireless protocols, such as any of the IEEE 802.11 protocols, WiMAX, or Bluetooth. When used for packet-switched data communication such as TCP/IP, the telematics unit can be configured with a static IP address or can be set up to automatically receive a dynamically assigned IP address from another device on the network, such as from a router or from a network address server (e.g., a DHCP server).

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as 2 G CDMA (IS-95), 3 G CDMA2000 (IS-2000, 1XRTT, EVDO), 2 G/2.5 G GSM (GPRS, EDGE), or 3 G W-CDMA (UMTS, HSPA). As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, a packet-switched data network (PSDN), and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. For example, computer 18 can be connected to one or more of the other system 10 components via a private or virtual private network (VPN) implemented through a leased line or Internet ISP in the PSDN. Each such computer 18 can be used for one or more purposes, such as a web server accessible by the vehicle via telematics unit 30 and wireless carrier 14. Other such accessible computers 18 can be, for example: a data center where diagnostic information and other vehicle data, such as preferences and/or trip data, can be uploaded from the vehicle via the telematics unit 30; a client computer used by the vehicle owner or other subscriber for such purposes as accessing or receiving trip/vehicle data or to setting up or configuring subscriber preferences or controlling vehicle functions; or a third party repository to or from which trip/ vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless local network using protocols such as 802.11x and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
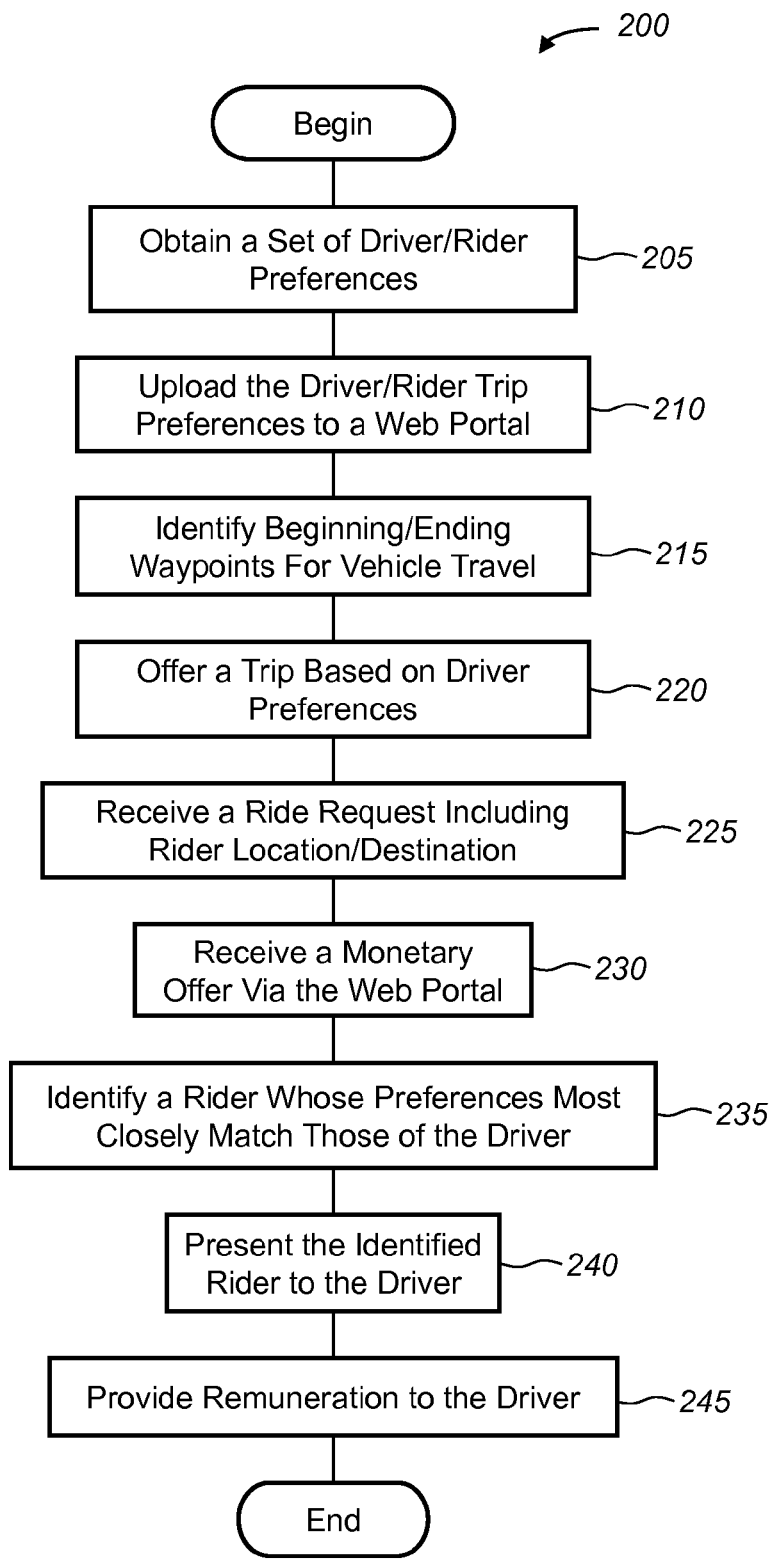
FIG. 2 is a flow chart depicting an exemplary embodiment of the method disclosed herein.

Turning now to FIG. 2, there is shown an exemplary example of a method of organizing the sharing of vehicle trips or rides. The method 200 begins at step 205 by obtaining a set of driver trip preferences and/or rider trip preferences at a central facility. Driver and rider trip preferences are types of trip data intended to help bring about a better driver/rider match. It should be appreciated that the term driver can not only include the vehicle operator, but also vehicle passengers as well. Examples of driver trip preferences include establishing the usual location(s) of the vehicle 12 used by the driver, the route over which the driver will travel, the number of riders the driver is willing to accept (or the vehicle can accommodate), the time(s) of day the driver travels/accepts riders, whether or not smoking is tolerated, whether the driver is making this trip once or regularly, and a threshold deviation the driver will tolerate. The threshold deviation can be a distance measured from the vehicle 12 or route the vehicle 12 travels that the driver is willing to travel in order to meet the rider. It is envisioned that some preferences are obtainable using the telematics device 20 of the vehicle 12. In one example, the location of the vehicle 12 can be obtained using the GPS module 40 and transmitted to the call center 20 or computer 18.

At least some of these trip preferences are applicable to a rider. For instance, the rider may specify as preferences the location of the rider, a temporal range and day the rider would like a ride, the size and/or type of vehicle the rider is willing to ride in, types of music the rider likes or dislikes, whether or not the rider smokes, or a threshold deviation from the rider's location he is willing to move in order to obtain a ride. Other preferences are possible and can be added based on a variety of circumstances, such as geographical location. For instance, if a rider lives in a mountainous area he could require four-wheel drive to reach his destination and could specify this requirement as part of the preferences. These preferences may be sent to and received by the computer 18, such as the data center. More particularly, the data center can be a back-office entity primarily used to send and receive data from the driver and/or rider. The method 200 proceeds to step 210.

Figure 3:
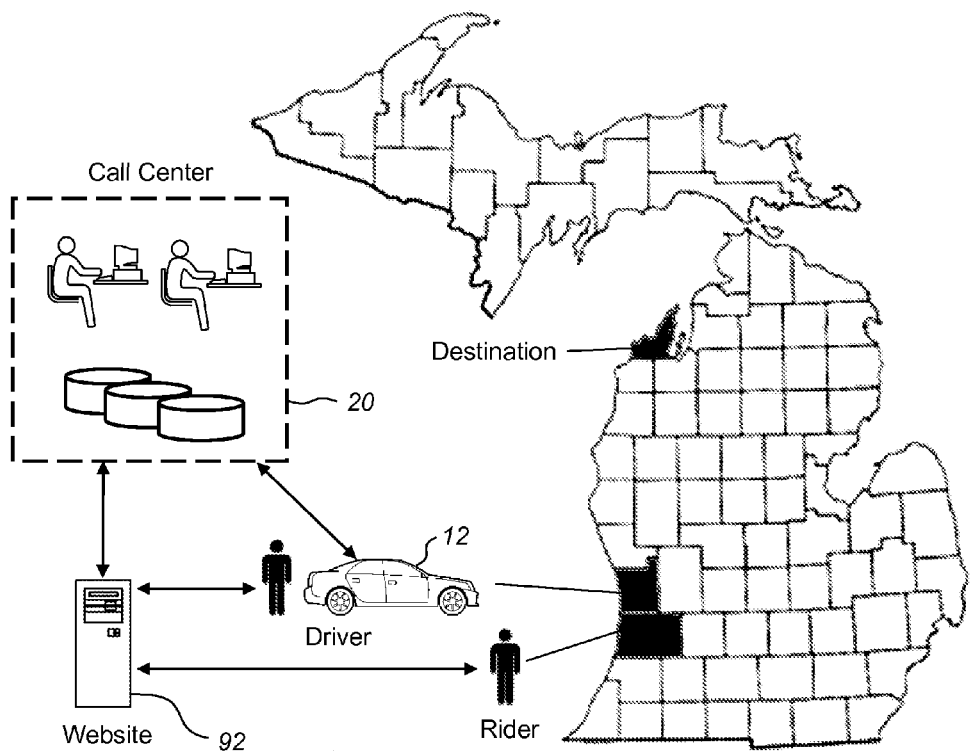
FIG. 3 is another block diagram depicting an exemplary embodiment of a system that is capable of utilizing the method disclosed herein.

At step 210, the driver trip preferences and/or the rider trip preferences are uploaded to a computer-based web portal. For instance, a driver or rider can input preferences into the web portal. Or the preferences can be received from a call center 20. Computer-based web portals can be websites, such as social networking sites or auction offering websites created, to offer and accept rides. At the web portal, the preferences can be used in a variety of ways. For instance, the driver and/or rider preferences can be displayed to other riders/ drivers in order to connect with a respective rider or driver. The driver and/or rider preferences can be saved into a profile that can be accessed and modified if the driver or rider desired. Preferences can be received at the vehicle 12 via the display 38 (e.g. a touchscreen interface) or via pushbuttons 34 and then sent to the data center via the telematics unit 30. A diagram is shown in FIG. 3 depicting an example 300 of a rider, driver, and the vehicle 12 and how each interact via a website 92 that can be implemented using computer 18 or can be hosted at the call center 20. In example 300, a rider and driver are physically located in the same general region or metropolitan area and, similarly, wish to travel to another similar area. The bounds of the geographic regions (both origination and destination) used in associating riders and drivers can be based on distance, geopolitical lines, etc. The information submitted by the driver and rider to the website 92 can be processed by the website according to the method of FIG. 2 using information stored in the call center database 84, and it will be appreciated by those skilled in the art that the database 84 can be physically located at the call center 20 or elsewhere.

At step 215, a beginning waypoint and an ending waypoint for vehicle travel are identified. Waypoints can be latitude and longitude coordinates usable by GPS receivers, such as the vehicle navigation module 40, and GPS maps for determining geographical locations. The waypoints can be determined when a driver presses the pushbutton 34 at particular locations to record a beginning or ending waypoint. At that time, the GPS receiver can determine the latitude and longitude coordinates and save them as either a beginning or ending waypoint. The waypoints can also be identified from a route entered by a driver into a vehicle navigation system. For example, the driver can enter an address into the vehicle navigation system, such as module 40, which can classify the address as the ending waypoint and the present location as the beginning waypoint. These waypoints can be saved with the driver/rider preferences described above. The method 200 proceeds to step 220.

At step 220, a trip is offered to riders using an auction web portal based on driver preferences. In this case, a rider can personally decide whether a particular trip offered by a driver is acceptable. It should be appreciated that the term trip can include not only a route with beginning and ending waypoints, but also latitude/longitude coordinates, addresses, or other location data indicating the location of the driver. The trip can be obtained by the web portal from the preferences established by the driver. In that case, if the driver has a regular route, it can be a standing offer for those riders who are travelling in a similar direction. In another example, the driver may provide trip data to the web portal while the driver is present in the vehicle. For instance, the driver may decide that he would offer a ride and then immediately input trip data into the telematics unit 30, which then can wirelessly transmit this data to the web portal for posting. The driver postings can then be presented to riders who can review the trips using a personal computer (PC), personal digital assistant (PDA), or smart phone. Riders can search the web portal using latitude/longitude coordinates, addresses, zip codes, names of cities, or other geographic identifiers. Riders can also search potential vehicle trips using a threshold deviation (e.g. searching for trips that begin no further than 10 miles from the rider's desired geographical location) to help the web portal display only the most relevant trips that would be of interest to the driver. In another example, the driver can save preferences and later, at any time when driving the vehicle 12, he can decide that he would share his vehicle 12 with a rider. At that time, the driver may send a message inviting a rider, using a device such as a smartphone, PDA, or telematics unit 30. This message can be received by the driver via the web portal 92, or a smartphone/PDA carried by the rider. The method 200 proceeds to step 225.

At step 225, a ride request is received from one or more riders that includes rider location and/or rider destination. After reviewing trips posted by drivers, a rider can select one trip. In one example, a driver has posted the route he travels and a rider thinks this route would pass near the rider's intended destination. The rider can then request/select a trip along this route with the driver. Selection can occur when the rider inputs the selection of the vehicle trip into the web portal. Inputting can occur in various forms, such as the selection of a radio button displayed by the web portal. It is also possible to send a confirmation receipt of the trip selection to the rider. In this way, the rider can be assured that the request has been received. The method 200 proceeds to step 230.

At step 230, a monetary offer is received from one or more riders through the auction web portal. In some instances, the driver preferences or route(s) posted to the web portal can involve a monetary amount that will be exchanged for transporting a rider. For instance, the preferences or route(s) posted by the driver may include a fixed fee for any rider. The fixed fee could be a fixed monetary value or a per-mile rate for driving the rider to his destination. Alternatively, the preferences or route(s) posted by the driver could be linked with an auction offering. This auction could be an offer to bid set to expire after a predetermined amount of time. Or the auction could be a Dutch auction that accepts sealed bids for a particular trip. The highest bidder can be selected who will be the rider transported by the driver. The web portal can also accept personal and financial information from riders. The personal information can include the rider's name, address, phone number, email address, or driver's license number. This information can be cross-referenced against criminal, credit, or other informational databases in order to discover information would make the rider undesirable. For example, if the rider had criminal convictions for assault it may be preferable to prevent that particular rider from accessing the rideshare system. Financial information can include the bank account number or credit card number of the rider. After receiving this information, the web portal can retain it and submit an appropriate amount of money to the driver and debit that amount to the rider's bank account or credit card account after the trip is complete. The method 200 proceeds to step 235.

At step 235, a rider is identified whose preferences most closely match those of the driver. In this case, the rider compatible with a particular driver can automatically be identified. For instance, the rider can be chosen based on trip preferences, geographical location, monetary offer, and/or destination. Or in other words, the rider nearest the driver, travelling to a destination nearest the driver, or the rider offering the most money for the trip can be identified using computer resources. Identification can be carried out using computer algorithms processed by computer resources. The computer resources can be located at the website 92, the call center 20, or any other suitable facility. It is possible a single rider can be identified, but also likely that several potential riders can be identified as having preferences closely matching those of the driver. The method 200 proceeds to step 240.

At step 240, the selected rider is presented to the driver. Whether selected manually or automatically, the driver is alerted that either a rider has selected his trip or that one or more riders have been selected as having preferences closely matching the drivers. The identity and location of the rider(s) can be transmitted to the driver. That transmission can include the time, day, and/or destination agreed upon. It can also be received by the telematics unit 30 and viewed using the display 38. While viewing the transmission, the driver can also have the option to either confirm or cancel the trip. Regardless of whether the driver cancels or accepts, a message indicating the driver's choice can be sent to the rider. In another example, the identity, location of the selected rider can be sent to the driver's PDA or smart phone. The method 200 proceeds to step 245.

At step 245, the driver is paid the monetary offer received from the rider. Upon completing the trip and depositing the rider at the agreed-upon destination, the driver can automatically be paid for his efforts. For example, the central facility, such as the call center 20 or web portal 92, can receive a signal or message sent by the driver using the telematics unit 30 or PDA/smart phone belonging to the driver. This message indicates that the rider has been safely taken to the agreed-upon destination and that the trip is complete. When the central facility receives this message, the appropriate amount of money can be debited from the rider and credited to the driver. In one example, the central facility can release funds after receiving a message from the rider indicating that the trip was completed to the rider's satisfaction. The rider can send the message from a PDA or smart phone. In another example, the central facility can release funds after both the rider and driver agree that the trip was completed satisfactorily. Messages such as these, whether or not rider and driver exchange money, can include feedback about the rider or driver. This feedback can include a wide variety of metrics, objective and subjective, such as cleanliness of the vehicle, friendliness of the rider/driver, the driver's relative adherence to traffic laws, whether the driver/rider was punctual, etc. The method 200 then ends.

Figure 4A:
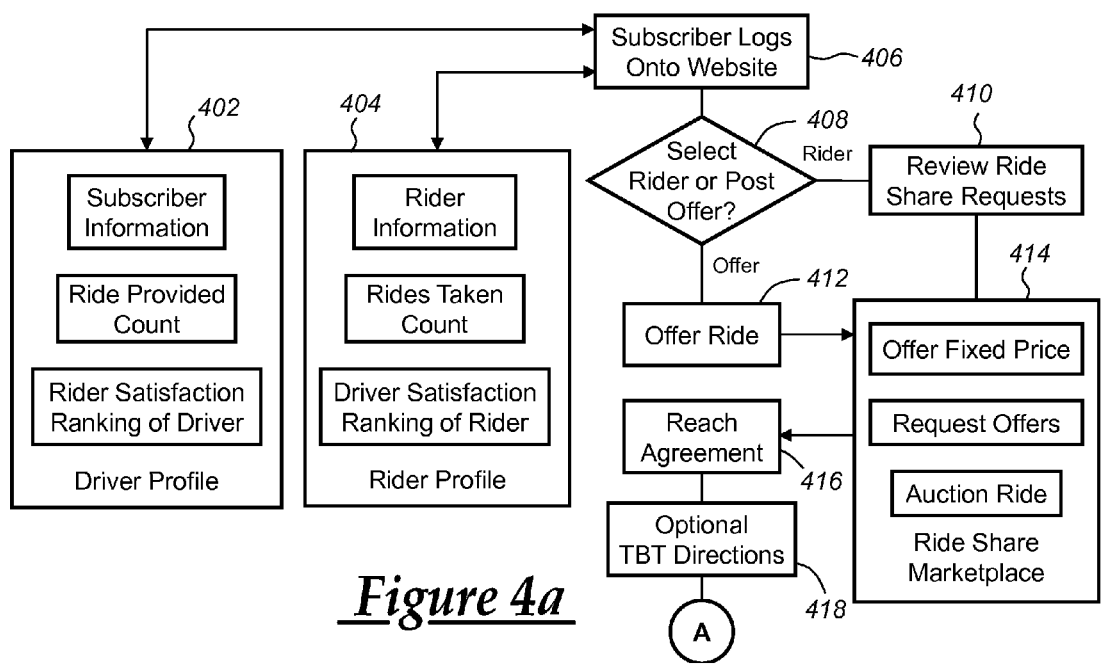
FIG. 4 is a flow chart depicting another exemplary embodiment of the method disclosed herein.
Figure 4B:
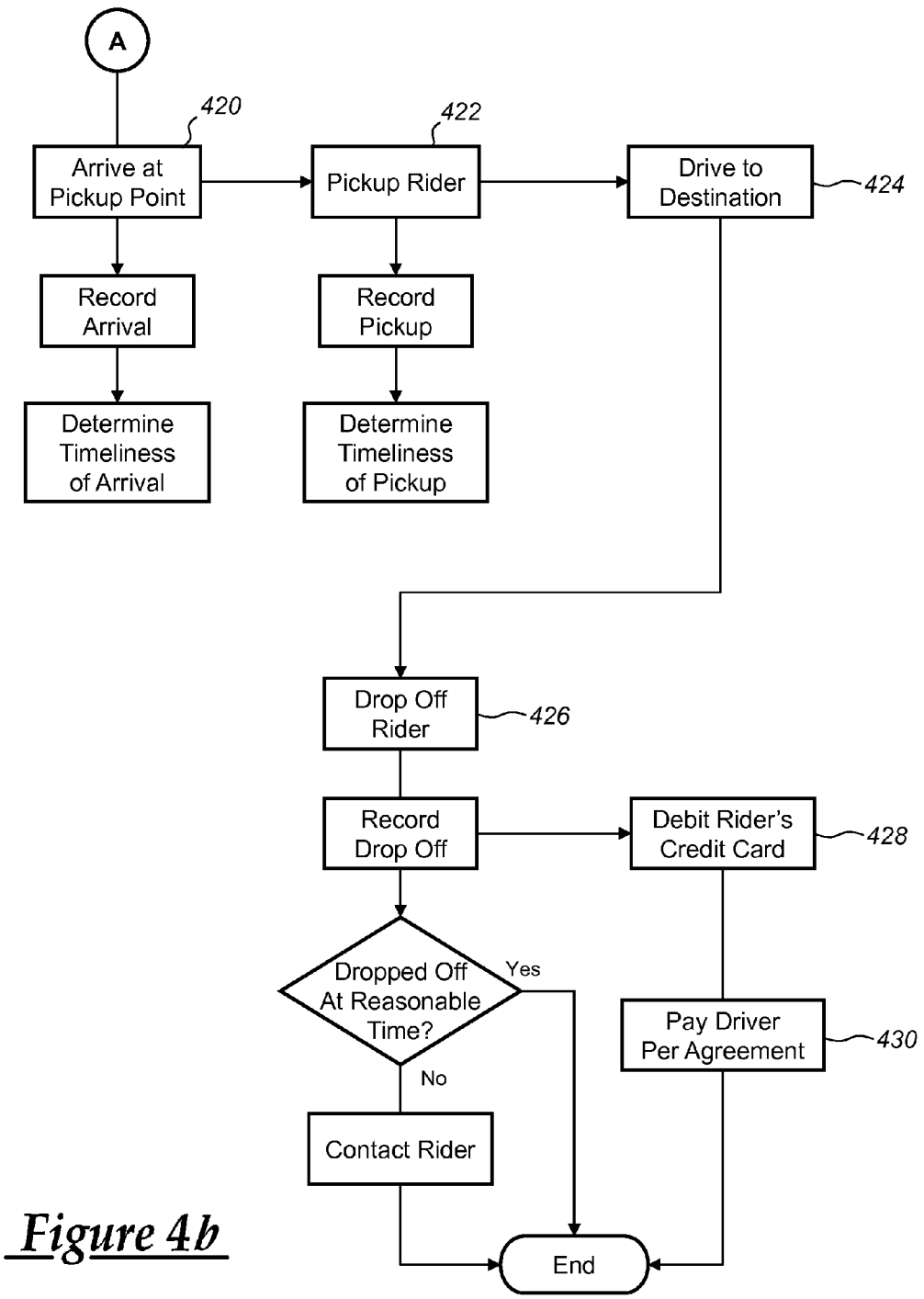

Turning to FIG. 4, there is shown an exemplary implementation of the method of sharing vehicle trips or rides. The method 400 begins at steps 402 or 404, which include establishing at least one driver and subscriber profile or both for a subscriber of the ride sharing service. A driver profile 402 can include the data trip preferences described with respect to step 205 of method 200. Additionally, the profile 402 can include other information, such as a counter indicating the number of rides that particular driver has provided to riders and a driver satisfaction ranking based on a survey of past riders. A rider profile 404 can also include the data trip preferences described with respect to step 205 but also include a counter indicating the number rides that particular rider has taken and a driver satisfaction rating based on a survey of past drivers. Given the established profiles 402 and 404, the driving or riding subscriber can log into a website 406 and access previously-stored profiles. Once accessed, the website can request that the driver/rider select whether they would like to select a rider or post an offer at step 408. If the subscriber selects choosing a rider, the method proceeds to block 410 and the subscriber can then be presented with one or more riders or rider profiles seeking rides. If the subscriber chooses to post a ride offer, the method 400 proceeds to step 412 and the subscriber can post a ride between two or more waypoints. The method 400 then proceeds to step 414.

At step 414, a ride share marketplace process coordinates the offers for rides and the riders seeking rides. The marketplace exists virtually and can be interacted with via devices such as PCs, PDAs, smartphones, or the telematics unit 30 to name a few. The ride share marketplace can be implemented at the call center or other remote facility. Using the marketplace, the subscriber can make or accept offers depending on his or her needs. For instance, if the subscriber is a rider, he may offer to pay a fixed price for a ride or request offers for a ride with a maximum price the rider is willing to pay. Alternatively, if the subscriber is a driver, he can offer a fixed-price ride or can auction a ride with a reserve price, such as a minimum price the driver will accept. The method 400 proceeds to step 416.

At step 416, the subscriber arrives at an agreement with a driver or rider. The agreement can be reached in a variety of ways. For example, a driving subscriber can accept a rider's fixed price offer for a ride or the driving subscriber could be the highest bidder among other drivers offering a rider a ride. In another example, a riding subscriber can accept a driver's fixed price offer for a ride or could be the highest bidder among other riders offering money for a ride. The method 400 proceeds to step 418.

At step 418, the driver receives turn-by-turn directions to the rider. After the driver and rider have agreed upon the ride, it can be helpful for the driver to easily navigate to the rider's location. The driver can receive turn-by-turn directions from the present location of the vehicle 12 to the location of the rider. The location of the rider can be inputted into the website or web portal, accessed by the data center 18 or call center 20, and received at the vehicle 12 via the telematics unit 30. In one example, the telematics unit 30 can receive the latitude and longitude coordinates and calculate the turn-by-turn directions at the vehicle 12. In another example, the data center 18 or the call center 20 can calculate the turn-by-turn directions and transmit them to the telematics unit 30. The turn-by-turn directions can then be audibly read over the audio system of the vehicle, visually displayed using display 38, or both. The method 400 proceeds to step 420.

At step 420, the driver arrives to pick up the rider. This event can be recorded as a driver arrival time; manually when the driver presses the button 34, or automatically when the telematics unit 30 detects that the vehicle 12 is located at latitude and longitude coordinates previously provided by the rider. At this time, the vehicle arrival time is recorded and saved at the telematics unit 30. This arrival time can be compared to the scheduled arrival time to determine timeliness of the driver and this information can be used as a metric of the driver's performance as a participant in the ride share marketplace. This can be used then by subsequent potential riders in determining whether they want to share a ride with this particular driver, and can be used automatically by the ride share marketplace in determining best fit candidates for any particular driver search. For example, the system can factor in timeliness of the driver so that a driver that has not been timely in his or her arrivals can be ranked lower in the results list of two or more potential drivers for any particular trip. In addition to or in lieu of storing the arrival time at the vehicle, it could be uploaded to the call center 20 or data center 18 so that the record of it and the timeliness determination can be made at the call center rather than at the vehicle. The method 400 proceeds to step 422.

At step 422, the rider enters the vehicle. This event can be recorded manually as a rider pickup time when the driver presses the button 34, which is saved. The rider pickup time can be recorded when the rider enters the vehicle 12 and uploaded at this time or saved and uploaded at a later time. Timeliness of the rider based on this pickup time can be determined and used as a metric of the rider's performance in much the same was as described above for the driver. This pickup time can also be used as the trip start time so that the total travel time can eventually be determined. Thus, a timeline of the trip can be preserved, either locally at the telematics unit 30, at the call center 20, or both. The method 400 proceeds to step 424.

At step 424, the driver transports the rider to the agreed-upon destination and at step 426, the driver drops the rider at that destination. The time of this event can be recorded manually when the driver presses the button 34, or automatically when the telematics unit 30 detects that the vehicle 12 is located at destination latitude and longitude coordinates previously provided by either the driver or rider. Then, the destination time of the vehicle is recorded and saved at the telematics unit 30. The destination time can be uploaded to the call center 20 or data center 18 at this time. Or, if the vehicle arrival time and rider arrival time have not been previously uploaded from the telematics unit 30, those two times and the destination time can be uploaded together. Recording the timeline of the trip can provide benefits. For example, given the beginning waypoints and ending waypoints, a reasonable amount of time can be calculated and allotted for the trip. If the calculated amount of time differs by a threshold amount from the amount of elapsed time of the trip recorded by the timer, the telematics unit 30 or call center 20 can contact the rider or alert family members or public services to ensure some event, such as unexpected traffic or weather, has not delayed the trip. In this situation, the call center 20 can also contact the telematics device 30 and determine the status of the trip. The check for a reasonable drop off time need not be made only after drop off is indicated by the driver, but can be done beginning at any time after pickup of the rider is confirmed at step 422 so that the attempted contact with the rider or others is made after more than a reasonable amount of travel time has elapsed regardless of whether drop off is signaled or not. The total determined travel time for the trip can also be used in the ride share marketplace as a metric either for the driver specifically or generally as an indication of the actual travel time required for the particular trip from one location to another. The method 400 proceeds to step 428.

At step 428, a credit card or other account belonging to the rider is debited. After determining that the rider has been dropped off at the desired destination in a timely and acceptable manner, the rider's debit account, such as a credit or debit card, can be debited or charged. The rider's debit account can be saved as part of the rider's subscriber profile and accessed by an entity such as the call center 20 or data center 18. At step 430, the driver is paid per the agreement, and this can be either the debited amount from the rider or another amount. For example, a portion of the amount paid by the rider can be retained by the ride share marketplace as consideration for the services provided, and the remainder amount can then be paid to the driver. The driver can save checking account routing numbers or other financial information capable of accepting monetary payments as part of the driver's subscriber profile and an entity such as the call center 20 or data center 18 can route the appropriate amount to the driver's account. Other means of exchanging payment between the rider and driver can be carried out; for example, by direct payment to the driver by the rider. However, by handling the debiting and payment automatically by the system as described above, it can ensure payment to the marketplace of its charges for the services.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, steps 230 and 245 of FIG. 2 could be eliminated where remuneration for a ride is not desired. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of organizing the sharing of vehicle trips, the steps comprising:
    (a) receiving a ride request at a central facility via a communications network from one or more riders, wherein the ride request includes a rider location and a rider destination;
    (b) identifying a beginning waypoint and an ending waypoint usable by global positioning system (GPS) receivers or GPS maps for vehicle travel, wherein at least one of the waypoints is obtained by a vehicle after the actuation of a vehicle device;
    (c) determining a vehicle route based on the beginning and ending waypoints using a telematics unit or a computer having computing resources;
    (d) choosing a rider whose rider location or rider destination is geographically closest to the determined vehicle route using the telematics unit or the computer;
    (e) accessing the criminal history, credit history, or both for the driver, the rider, or both using databases accessible by the central facility;
    (f) if the accessed history is acceptable, transmitting the beginning and ending waypoints, a rider location, and a rider destination from a call center to the vehicle telematics unit over a wireless carrier system;
    (g) presenting the rider location and rider destination of the chosen rider to the driver via an in-vehicle display or a vehicle audio system; and
    (h) if the driver accepts, sending a notification from a vehicle telematics unit via the communications network to the chosen rider alerting the chosen rider of the acceptance.

2. The method of claim 1, further comprising the step of querying a driver for a threshold deviation from the determined route.

3. The method of claim 1, further comprising the step of providing the driver turn-by-turn directions to the rider location.

4. The method of claim 1, wherein one or more riders enter the ride request into a web portal.

5. The method of claim 1, wherein waypoints further comprise latitude and longitude coordinates established in a vehicle.

6. The method of claim 1, wherein the rider location is presented to the personal digital assistant (PDA) or smart phone belonging to the driver that is wirelessly networked with the vehicle telematics unit.

7. A method of organizing the sharing of vehicle trips, the steps comprising:
    (a) obtaining a set of driver trip preferences at a central facility;
    (b) accepting a set of trip preferences from one or more riders, wherein the preferences include a rider location;
    (c) receiving a message from the driver sent from a vehicle indicating that a rider is invited;
    (d) accessing the trip preferences of the driver;
    (e) comparing the trip preferences of the driver with the trip preferences of the one or more riders using a computer having computing resources;
    (f) identifying the rider whose set of trip preferences most closely match those of the driver using the computer;
    (g) communicating the location of the identified rider to the driver;
    (h) calculating a hypothetical trip duration for the vehicle trip;
    (i) recording the time that elapses between the time at which the driver picks up the identified rider and the time at which the driver drops the identified rider off using a telematics unit; and
    (j) if the calculated hypothetical trip duration differs from the recorded time that elapses by more than a predetermined amount, communicating an alert notification between the telematics unit and the central facility.

8. The method of claim 7, further comprising the step of querying the driver or the rider for a threshold deviation from the determined route.

9. The method of claim 7, wherein step (f) further comprises the step of identifying a rider whose rider location or rider destination is geographically closest to the vehicle location.

10. The method of claim 7, further comprising the step of receiving feedback from the driver or the rider based on a completed vehicle trip.

11. The method of claim 6, wherein the location of the identified rider is presented to the driver in a vehicle using turn-by-turn directions.

12. A method of organizing the sharing of vehicle trips, the steps comprising:
    (a) obtaining a set of driver trip preferences at a central facility;
    (b) uploading the driver trip preferences to a computer-based auction web portal;
    (c) offering a trip to riders using the auction web portal based on the driver preferences;
    (d) receiving a monetary offer or a location from one or more riders through the auction web portal;
    (e) selecting a rider offering the highest monetary offer or the location nearest the driver;
    (f) sending the location of the selected rider to a vehicle telematics unit;
    (g) presenting the selected rider to the driver via an in-vehicle display or a vehicle audio system;

(h) receiving confirmation at the vehicle from the driver that the ride is accepted;
(i) transmitting the received confirmation to the central facility from the vehicle telematics unit;
(j) if the driver accepts the selected rider, transmitting the location of the selected rider to the driver; and
(k) paying the driver the monetary offer received from the selected rider.

13. The method of claim 12, further comprising the step of querying the driver or the rider for a threshold deviation from the determined route.

14. The method of claim 12, wherein step (g) further comprises presenting the rider to a personal digital assistant (PDA) or smart phone that is wirelessly networked with the vehicle telematics unit.

15. The method of claim 12, wherein driver trip preferences further comprise one or more latitude and longitude coordinates.

16. The method of claim 12, wherein the location of the identified rider is presented to the driver in a vehicle using turn-by-turn directions.

17. The method of claim 12, further comprising the step of obtaining financial account information from the rider and the driver.

18. The method of claim 17, further comprising the step of debiting the financial account of the rider and crediting the financial account of the driver after the vehicle trip is completed.

* * * * *